(12) United States Patent
Furman et al.

(10) Patent No.: US 11,763,101 B2
(45) Date of Patent: Sep. 19, 2023

(54) PORTABLE RADIO HAVING STAND-ALONE, SPEECH RECOGNITION AND TEXT-TO-SPEECH (TTS) FUNCTION AND ASSOCIATED METHODS

(71) Applicant: HARRIS GLOBAL COMMUNICATIONS, INC., Albany, NY (US)

(72) Inventors: William Nelson Furman, Fairport, NY (US); John W. Nieto, Rochester, NY (US); William M. Batts, West Henrietta, NY (US); Marcelo De Risio, Penfield, NY (US); Denise Ann Wing, Holley, NY (US)

(73) Assignee: HARRIS GLOBAL COMMUNICATIONS, INC., Albany, NY (US)

(*) Notice: Subject to any disclaimer, the term of this patent is extended or adjusted under 35 U.S.C. 154(b) by 265 days.

(21) Appl. No.: 16/867,608

(22) Filed: May 6, 2020

(65) Prior Publication Data
US 2021/0350089 A1    Nov. 11, 2021

(51) Int. Cl.
  G06F 40/58    (2020.01)
  G06N 20/00    (2019.01)
  G10L 13/047   (2013.01)

(52) U.S. Cl.
  CPC ............. *G06F 40/58* (2020.01); *G06N 20/00* (2019.01); *G10L 13/047* (2013.01)

(58) Field of Classification Search
  CPC ........ G06F 40/58; G06N 20/00; G10L 13/047
  See application file for complete search history.

(56) References Cited

U.S. PATENT DOCUMENTS 6,151,572 A    11/2000  Cheng et al.
8,583,431 B2 * 11/2013  Furman ................... G10L 15/26
                                                    704/235
9,476,718 B2   10/2016  Herforth
(Continued)

OTHER PUBLICATIONS

Khalil, R. T., A. F. Khalifeh and K. A. Darabkh, "Mobile-free driving with Android phones: System design and performance evaluation", 2012, 9th International Multi-Conference on Systems, Signals and Devices, pp. 1-6. (Year: 2012).*

(Continued)

*Primary Examiner* — Daniel C Washburn
*Assistant Examiner* — James Boggs
(74) *Attorney, Agent, or Firm* — ALLEN, DYER, DOPPELT, + GILCHRIST, P.A.

(57) ABSTRACT

A portable radio may include a radio frequency (RF) transmitter, an RF receiver, and an audio input transducer. A controller may store command messages and speech messages, implement a stand-alone, speech recognition and text-to-speech (TTS) function for the stored command messages and stored speech messages. The controller may also control at least one of an RF transmitter and RF receiver of a remote radio based upon an input command matching one of the stored command messages using the audio input transducer and the stand-alone speech recognition and TTS function, and convert a speech message matching one of the stored speech messages into a text message. The RF transmitter may send the text message to the remote receiver.

27 Claims, 4 Drawing Sheets

(56) References Cited

U.S. PATENT DOCUMENTS

| | | | |
|---|---|---|---|
| 9,622,053 B1* | 4/2017 | Heinen | G10L 15/01 |
| 9,842,604 B2* | 12/2017 | Son | H04W 88/181 |
| 10,263,668 B2* | 4/2019 | Li | H04R 1/1091 |
| 10,506,388 B1 | 12/2019 | Furman et al. | |
| 10,623,030 B2* | 4/2020 | Lascari | H04B 1/0075 |
| 11,265,836 B2* | 3/2022 | Petkov | H04W 72/042 |
| 2005/0031016 A1 | 2/2005 | Rosen | |
| 2013/0060561 A1* | 3/2013 | O'Dell | G06F 40/126 |
| | | | 704/9 |
| 2018/0343024 A1 | 11/2018 | Sahebjavaher et al. | |
| 2019/0364492 A1* | 11/2019 | Azizi | H04W 68/005 |
| 2020/0372796 A1* | 11/2020 | Gajapala | G08G 1/0962 |

OTHER PUBLICATIONS

Moran, Thomas M., "Formatted Voice Messages in Tactical Communication", 1992, Proceedings of the Tactical Communications Conference, vol. 1, pp. 165-170. (Year: 1992).*

Vane, Michael, E. Hanlon, R. Route, and D. MacGhee, "Brevity: Multi-Service Brevity Codes", 2003, FM 3-54.10 (US Army Training and Doctrine Command), MCRP 2-25B (Marine Corps Combat Development Command), NTTP 6-02.1 (Navy Warfare Development Command), and AFTTP(I) 3-25 (Air Force Doctrine Center). (Year: 2003).*

Szabo et al., "Increasing the robustness of the wireless communication links in hostile radio frequency (RF) environment", IEEE, 23rd Conference Radioelektronika, Apr. 2013, pp. 278-283.

* cited by examiner

PORTABLE RADIO HAVING STAND-ALONE, SPEECH RECOGNITION AND TEXT-TO-SPEECH (TTS) FUNCTION AND ASSOCIATED METHODS

FIELD OF THE INVENTION

The present invention relates to the field of communications, and, more particularly, to a radio that converts speech messages into text messages, and received text messages back to speech.

BACKGROUND OF THE INVENTION

Some communications devices are difficult for users to manage and navigate. Many users want a simple interface to help manage and navigate their devices with minimum hands-free operation. Speech recognition has been found helpful in some devices and in automobiles to simplify user interaction. The user may speak a command to define a word, turn on the radio, or locate a destination. These approaches usually rely on an internet connection for speech recognition, where the user voices commands and the device makes a direct connection to an internet server, which applies intensive computational resources to recognize speech. These systems, however, will not work well with portable radios that do not have internet access, have limited memory, limited processing capability and limited power.

Some radios incorporate a Mixed-Excitation Linear Prediction (MELP) digital voice vocoder that compresses and encodes audio and operates at 600, 1200, and 2400 bit/s. However, even in a MELP 2400 radio transmitting at 2400 bit/s, simple statement, such as "meet me by the bridge" is three seconds in length and requires 7200 bits when transmitted. In portable radios that are size, weight and power (SWaP) constrained, even these simple commands may become computationally and memory intensive. In severely degraded wireless links, even a small amount of data (7200 bits) can be difficult to send.

Some automobiles incorporate speech recognition as part of the vehicle navigation system, such as disclosed in U.S. Pat. No. 9,476,718, where a telecom device communicates over the Internet to access a speech database having samples of recognized digital speech. Another radio system uses automatic attendants that assist with speech-to-text conversion, such as disclosed in U.S. Pat. No. 6,151,572, where two-way communication exists between a radio and base station for accessing a phoneme library, thus requiring a direct, high speed connection to the Internet. Communicating with a base station and accessing a phoneme library is time consuming, bandwidth intensive, and inefficient.

SUMMARY OF THE INVENTION

In general, a radio may include a radio frequency (RF) transmitter configured to be in communication with a remote RF receiver of a remote radio, an RF receiver configured to be in communication with a remote RF transmitter of the remote radio, and an audio input transducer. A controller may be coupled to the RF transmitter, RF receiver, and audio input transducer, and configured to store a plurality of command messages and speech messages, implement a stand-alone, speech recognition and text-to-speech (TTS) function for the stored command messages and stored speech messages. The controller may also be configured to control at least one of the RF transmitter and RF receiver of the remote radio based upon an input command matching one of the stored command messages using the audio input transducer and the stand-alone, speech recognition and TTS function, and convert a speech message matching one of the stored speech messages into a text message using the audio input transducer and the stand-alone speech recognition and TTS function. The text message is sent to the remote receiver using the RF transmitter.

In an example, the RF transmitter may have a bit rate of less than or equal to 75 bit/s, may have a bandwidth in a range of 3 KHz to 25 KHz, and may operate in an RF band of 1.5 to 60 MHz. In yet another example, the radio may comprise a portable housing containing the RF receiver, RF transmitter, audio input transducer and controller. The controller may be configured to send the text message as a SMS message. The radio may comprise an audio output transducer, and the controller may be configured to generate a synthesized speech message using the audio output transducer in cooperation with the RF receiver.

The controller may also be configured to operate using machine learning, and the controller may be configured to implement at least one command based upon at least one RF performance parameter. In another example, the controller may be configured to implement a multi-language translation function.

Another aspect is directed to a method of operating a radio. The method may include operating a controller coupled to an RF transmitter, an RF receiver, and an audio input transducer, to store a plurality of command messages and speech messages, implement a stand-alone, speech recognition and text-to-speech (TTS) function for the stored command messages and stored speech messages, and control at least one of an RF transmitter and RF receiver of a remote radio based upon an input command matching one of the stored command messages using the audio input transducer and the stand-alone, speech recognition and TTS function. The method includes converting a speech message matching one of the stored speech messages into a text message using the audio input transducer and the stand-alone speech recognition and TTS function, and sending the text message to the remote receiver using the RF transmitter.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
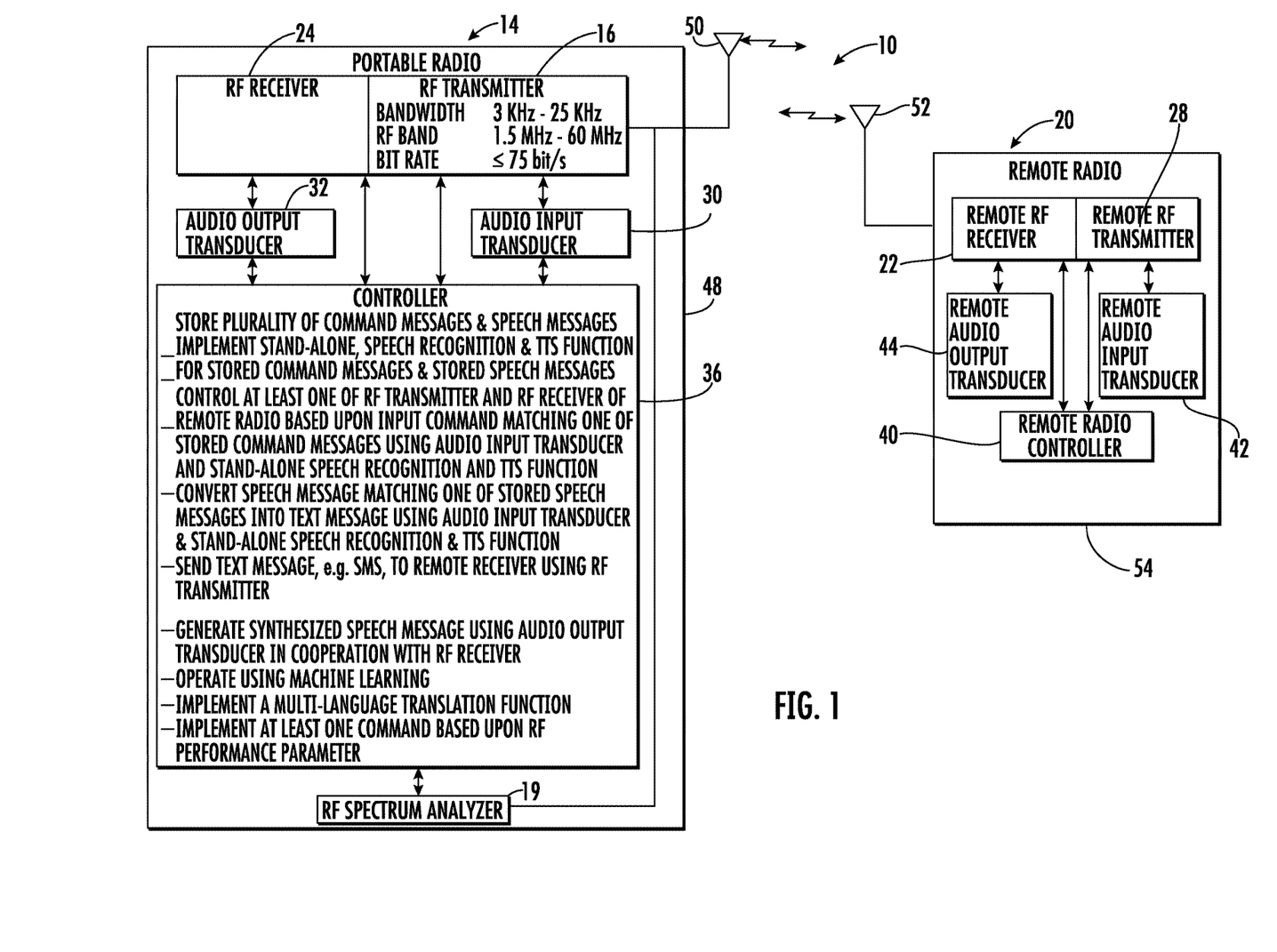
FIG. 1 is a block diagram of the radio according to an example.

Referring now to FIG. 1, there is illustrated a portable radio system indicated generally at 10 and having a radio 14 that includes a radio frequency (RF) transmitter 16 configured to be in communication with a remote radio 20 and its remote RF receiver 22. The radio 14 includes an RF receiver 24, which is in communication with a remote RF transmitter 28 of the remote radio 20. The radio 14 also includes an audio input transducer 30, e.g. a microphone, operative with the RF transmitter 16, and an audio output transducer 32, e.g. a speaker, operative with the RF receiver 24. A controller 36 is coupled to the RF transmitter 16, RF receiver 24, audio input transducer 30, and audio output transducer 32 and controls their operational characteristics and functions, as well be appreciated by those skilled in the art. Similar functional components may be incorporated in the remote radio 20, such as a remote radio controller 40, remote audio input transducer 42 and remote audio output transducer 44 as will also be understood by those skilled in the art.

The radio 14 illustratively includes a portable housing 48 that carries the RF transmitter 16, RF receiver 24, audio input transducer 30, audio output transducer 32 and controller 36. Both the RF transmitter 16 and RF receiver 24 may operate to transmit and receive via a single or multiband antenna indicated generally at 50. Likewise, the remote radio 20 includes a remote antenna 52 and housing 54, which could be portable. The housing 54 as with the portable radio 14 carries the remote RF receiver 22, remote RF transmitter 28, remote radio controller 40, remote audio input transducer 42 and remote audio output transducer 44.

The controller 36 is configured to store a plurality of command messages and speech messages and implement a stand-alone, speech recognition and text-to-speech (TTS) function for the stored command messages and stored speech messages. The controller 36 is further configured to control at least one of the RF transmitter 16, and remote RF receiver 22 of the remote radio 20 based upon an input command matching one of the stored command messages using the audio input transducer 30 and the stand-alone, speech recognition and TTS function. The controller 36 may convert a speech message matching one of the stored speech messages into a text message using the audio input transducer 30 and the stand-alone, speech recognition and TTS function and send the text message to the remote RF receiver 22 using the RF transmitter 16. In an example, the text message is an SMS (Short Messaging Service).

The controller 36 may also generate a synthesized speech message using the audio output transducer 32 in cooperation with the RF receiver 24. Because the portable radio 14 may have a limited size, power, and weight, the RF transmitter 16 may have a bit rate of less than or equal to 75 bits a second (bit/s) and a bandwidth in the range of about 3 KHz to about 25 KHz. The RF transmitter 16 may operate in an RF band of about 1.5 to 60 MHz, for example, but may operate in different frequency ranges, including UHF.

In an example, the controller 36 is configured to implement at least one command based upon at least one RF performance parameter. For example, the radio 14 may receive performance data or other information as an incoming message about the signal parameters where the signal-to-noise ratio is at a certain value or there is a high Voltage Standing Wave Ratio (VSWR) at a faulty antenna connection, or triggered by an event recognized by a remote sensor. The radio 14 may receive a text message from a base station or headquarters that could be processed via the RF receiver 24 and audio output transducer 32, allowing the portable radio 14 to play a voice message that the device power should be increased. The radio 14 may include a spectrum analyzer 19 that cooperates with the controller 36 and analyzes RF signals at or adjacent the radio in the frequency band of communication and makes corresponding changes in operation of the RF transmitter 16 or RF receiver 24 via the controller in response to sensed RF energy, such as playing a voice message that it is doing so.

The controller 36 may implement a multi-language translation function so that audio or text received in a foreign language may be translated and played via the audio output transducer 32. A user may speak a foreign language and may give a command in that foreign language, which is translated and then transmitted as English in a text or SMS message. The controller 36 may also operate using machine learning. For example, if the radio 14 includes the spectrum analyzer 19 that analyzes the RF energy across a frequency band at which the RF transmitter 16 or RF receiver 24 operates, then any speech recognition may be "honed" and improved by maintaining signal metrics and working improvements to any speech recognition process based upon RF performance characteristics and metrics.

Cognitive artificial intelligence (AI) concepts may be applied with machine learning for guided troubleshooting. The radio 14 may determine an error or a potential error condition, alert the user of the radio via a voice message, and suggest a remedy. For example, the radio 14 may announce there is a high Voltage Standing Wave Ratio (VSWR) and instruct the user to check the antenna connection by retrieving and announcing via the audio output transducer 32 a stored speech message, such as "check VSWR and antenna connection."

Another message could indicate that the battery at the portable radio 14 is at a limited 10% capacity and should be recharged. It is also possible to include channel propagation assistance. For example, a low signal-to-noise ratio may be consistently measured by a user at another device, e.g., the remote radio 20, and a message transmitted from the remote radio to the radio 14 that the communication signal from the portable radio to the remote radio is weak and low quality and to change frequency or use a more robust modem and signal. The artificial intelligence and machine learning may include real-time "tweaking" of any voice recognition algorithm and adding to any library of stored command messages and stored speech messages.

The controller 36 may store command messages and stored speech messages in a stand-alone message library as part of the radio 14. This message library can be loaded remotely over-the-air (OTA) to the portable radio 14 or by using a software data loading utility. It is also possible to load and store command messages and speech messages when the portable radio 14 is initially configured at a factory. It is also possible to load a set of command messages and speech messages and any short phrases before a specific deployment. It is possible to change OTA certain parameters that the radio 14 should monitor at a remote site. The command messages and speech messages may be tailored for expected conditions, landmarks, and/or capabilities that the radio 14 and any remote radio 20 may encounter during a specific time period or mission.

Reducing or minimizing the total command message and speech message set has multiple benefits because it can aid in compressing text messages. For example, a text message "meet me by the bridge" may be coded as "M3." Minimizing a message set also improves the overall performance of the controller 36 and minimizes the processing used in voice recognition and any text-to-speech or speech-to-text as part of its firmware or software. It is easier to correctly recognize a word or phrase when it has a possibility of 1 out of 100, versus 1 out of 100,000. A minimized message set may also reduce the MIPS (Million instructions per second) and memory requirements of the radio 14.

It is possible to control the portable radio 14 operational characteristics, such as the channel, mode, call, transmit power and RSSI (Received Signal Strength Indication). A level of control over these radio functions may allow the radio 14 to operate in a better "hands-off" and "eyes-off" operation, and permit intelligent voice based control, which allows the user to control and communicate without touching the radio knobs or looking at the display screen. As a result, the user may devote full attention to the task at hand.

It is also possible to control feedback via a text-to-speech function for "hands-free" and "eyes-free" operation. Voice feedback may occur via a headset worn by the user. It is possible to include feedback with text-to-speech or speech-to-text conversion via the audio output transducer 30 or audio input transducer 32. For example, the controller 36 may give an instruction to the audio output transducer 32 to voice a message that the portable radio 14 is operating on Channel 5 and to switch to Channel 6, or the transmit power is 5 watts and to increase to 10 watts.

Likewise, user commands could be implemented, such as, "call command post." An example call to the command post or another remote radio 20 could be the phrase "meet me by the bridge" which is about 3 seconds in length and would be about 7200 bits using an MELP 2400 standard, but with the current example using the radio 14, the phrase "meet me by the bridge" could be recognized and identified and compressed to a small number of bits (for example 50), and transmitted. This results in a shorter and more robust transmission with longer battery life for the radio 14.

Figure 2:
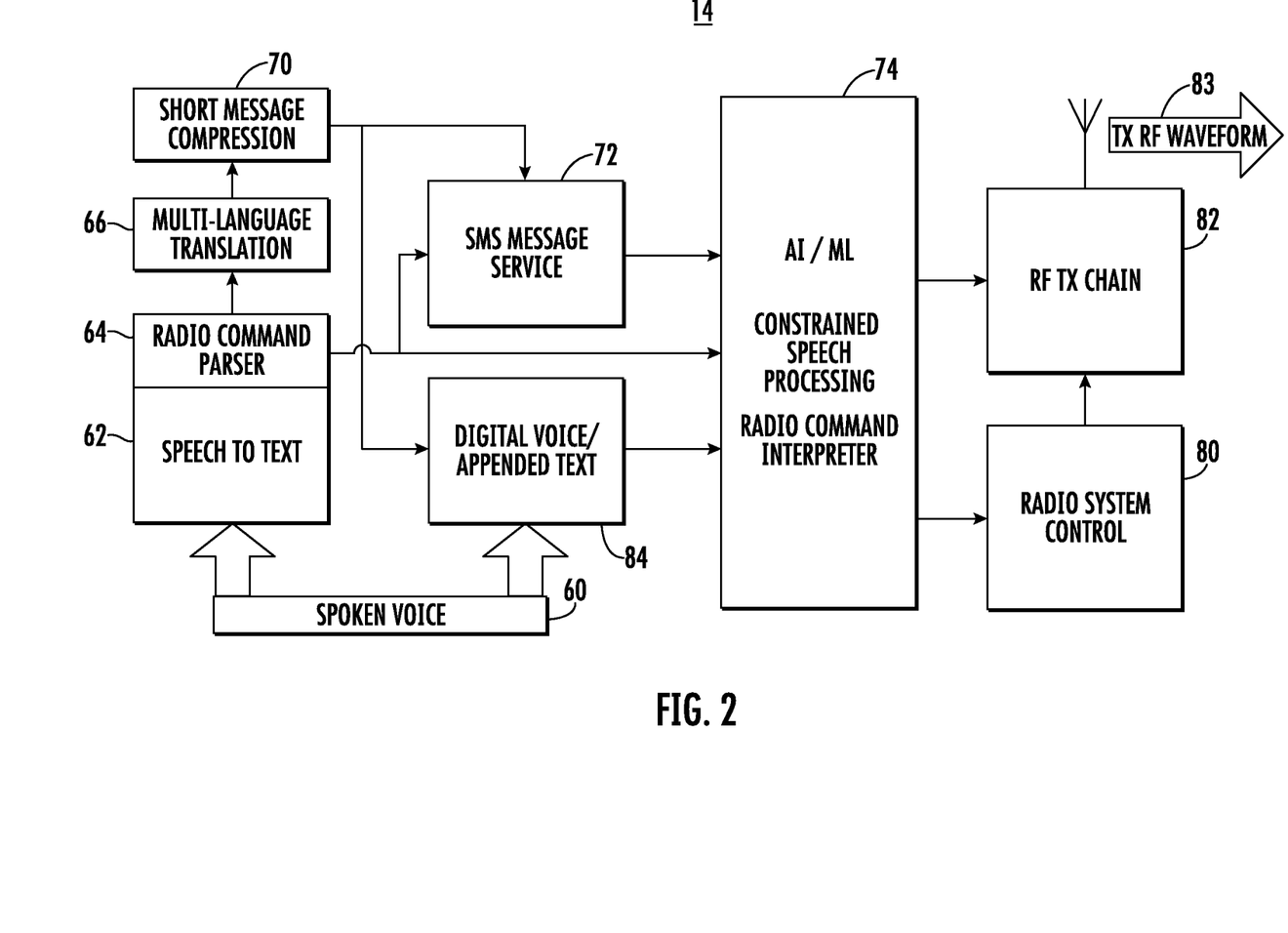
FIG. 2 is a block diagram showing transmit functions of the controller for the radio of FIG. 1.

Referring now to FIG. 2, there is illustrated a block diagram of the controller 36 that cooperates with the RF transmitter 16 at the portable radio 14. For example, a user could speak a short message or command 60, which could be a command message or a speech message. The speech is converted to text 62 by the speech recognizes and parsed via a radio command parser module 64 that may convert the text of the voice into individual or parsed units of voice text, making the text more manageable when transmitted via SMS. It is possible that the radio command parser module 64 may determine if the spoken word is a control command for the radio or a message to be transmitted. The parsed text as converted voice may be translated via a multi-language translation module 66 if the speech was originally in a foreign language, such as Spanish, and converted to English. Alternatively, the English text if spoken originally in English could be translated into a foreign language, such as Spanish. In this example, the original speech message may match one of the stored speech messages and be converted into a text message using the audio input transducer 30 and stand-alone speech recognition and TTS function. Before transmitting, however, the text as parsed is processed via a short message compression algorithm 70, such as using the compression algorithm described in commonly assigned U.S. Pat. No. 10,506,388, the disclosure which is hereby incorporated by reference in its entirety. The text message strings received from the radio command parser module 64 are compressed. In some cases, the text strings may be stored within the message library at the portable radio 14 and the controller 36 may operate via a look-up table to retrieve and compress them.

The short message compression algorithm 70 operates via the controller 36 and may include a cyclic redundancy check (CRC) encoding function to calculate CRC codes. Once compression occurs, the text message is prepared at the message service module 72 for transmission as an SMS message. Any artificial intelligence and machine learning algorithms 74 may be applied at the controller 36 and include constrained speech processing and radio command interpretation. The radio system control module 80 operates with the RF transmitter 16 so that the proper modulation and signal processing occurs and the SMS message is transmitted properly to the remote receiver 22. The RF transmitter 16 may include a chain of RF transmitter circuits 82 that emits the RF signal waveform 83.

In some cases, the spoken voice may be digitized and appended to a text message 84, such as an SMS message, using the system as described in U.S. Pat. No. 8,583,431, the disclosure which is hereby incorporated by reference in its entirety. In this system disclosed in the '431 patent, a digital speech message may be multiplexed with a text message as an SMS message and transmitted to the remote radio 20, which demultiplexer the multiplexed signal and the digital voice portion to which the SMS is appended, into a speech message and corresponding text message, and decodes any speech message. The remote radio controller 40, may operate a text processor to display the corresponding text message and/or convert it to audio. The digital voice with the appended text 84 may be further processed by the controller 36 to determine any artificial intelligence and machine learning parameters that may be operative with any constrained speech processing and the radio command 74. The radio system control 80 may modulate the RF signal and transmit the RF waveform 83 to the remote radio 20.

Figure 3:
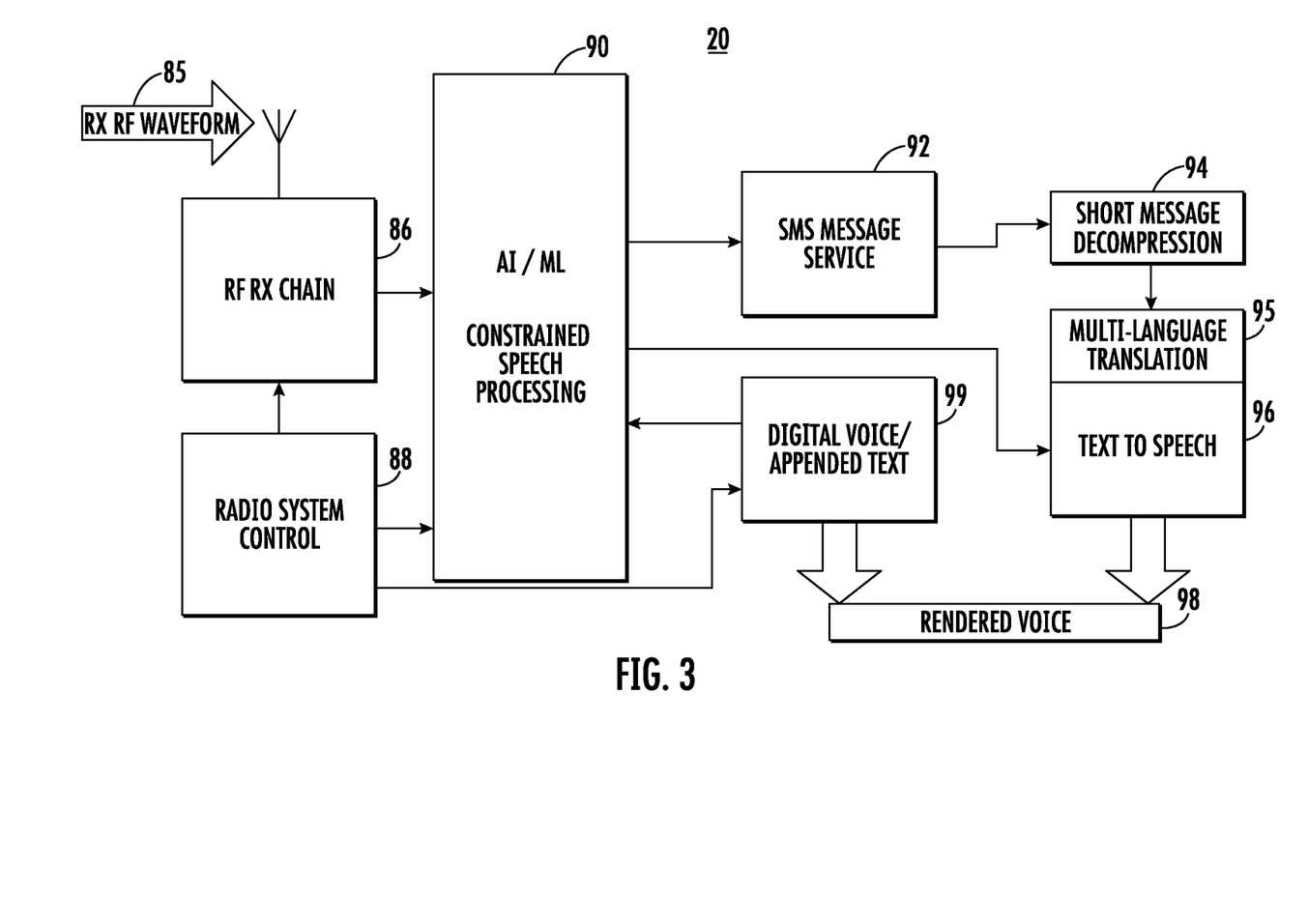
FIG. 3 is a block diagram showing receive functions of the controller for the radio of FIG. 1.

Referring now to FIG. 3, there is illustrated a controller 36 with functions that may operate with the RF receiver 24, such as when it receives an SMS message alone or with appended digital voice and appended texts. The description, of course, may apply to the remote receiver 20 and its remote RF receiver 22, and the description will now proceed relative to the remote RF receiver. The signal waveform 85 transmitted from the portable radio 14 is received within the remote RF receiver 22, which may include a chain of different receiver circuits 86. The radio system control 88 may process and demodulate the signal waveform and the data processed for any constrained speech and artificial intelligence or machine learning functions 90. If it is a SMS message alone, the SMS message service module 92 may process the SMS message, and if necessary, apply short message decompression 94, such as using the system as described in the incorporated by reference '388 patent, and translate any foreign language text using the multi-language translator 95 and convert the text to speech 96 to render voice 98. Likewise, digital voice and an appended text could be decoded and separated 99 using the commonly assigned system as described in the incorporated by reference '431 patent.

Figure 4:
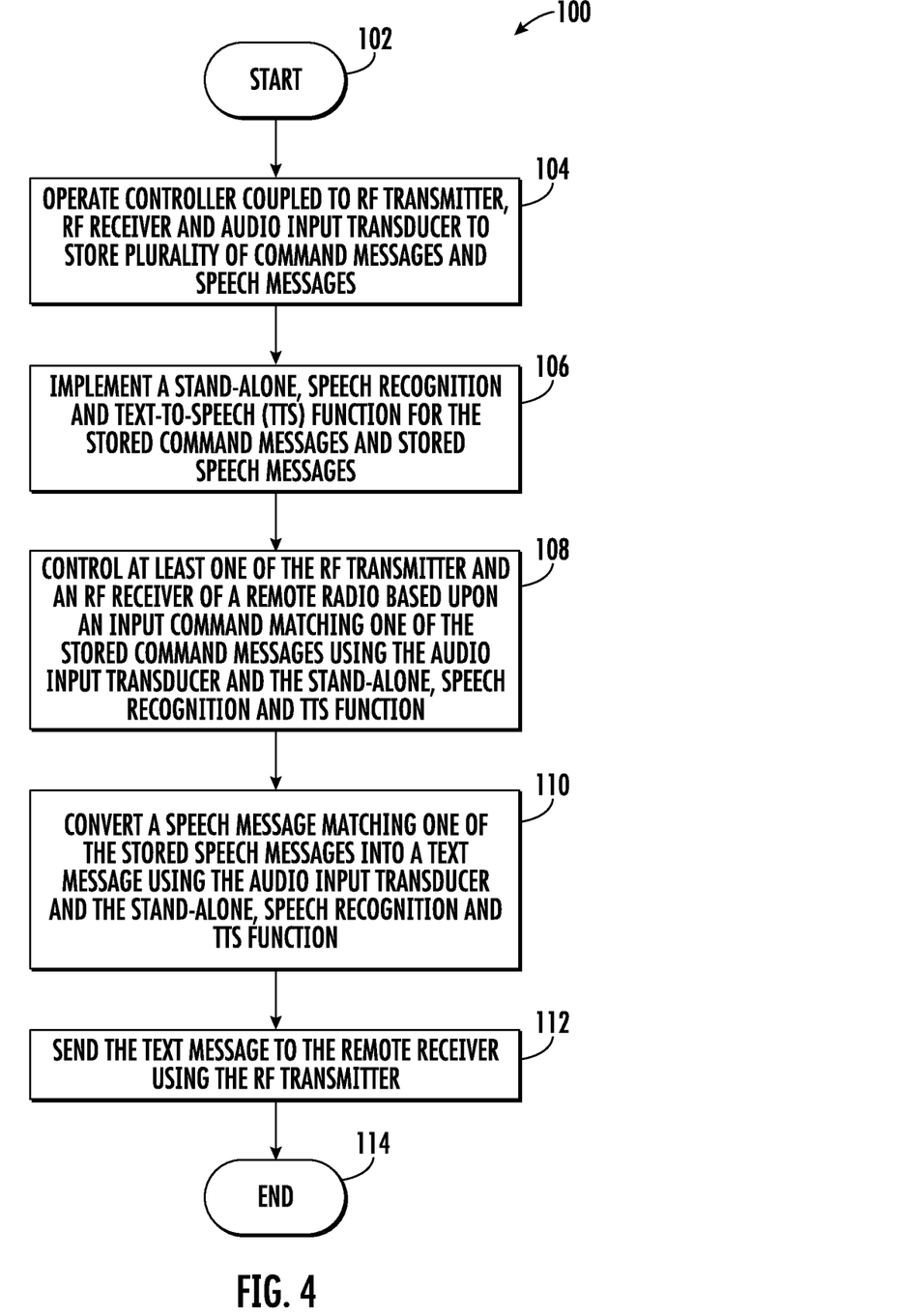
FIG. 4 is a high level flowchart of a method of operating the radio of FIG. 1.

Referring now to FIG. 4, there is illustrated a flowchart showing a method of operating the portable radio of FIG. 1 and illustrated generally at 100. The process starts (Block 102) and the controller 36 that is coupled to the RF transmitter 16, RF receiver 24 and audio input transducer 30 at the portable radio 14 is operated to store a plurality of command messages and speech messages (Block 104). The controller 36 implements a stand-alone, speech recognition and text-to-speech (TTS) function for the stored command messages and stored speech messages (Block 106). The controller 36 may control at least one of the RF transmitters 16 and an RF receiver of the remote radio 20 based upon an input command matching one of the stored command messages using the audio input transducer 30 and the stand-alone speech recognition and TTS function (Block 108). A speech message matching one of the stored speech messages may be converted into a text message using the audio input transducer 30 and the stand-alone speech recognition and TTS function (Block 110). The text message is sent to the remote receiver 20 using the RF transmitter 16 (Block 112). The process ends (Block 114).

The portable radio 14 may provide a self-contained speech recognition system without requiring internet access and may recognize and convert to text a library of spoken radio messages and provide a simpler interface for users to help manage and navigate the portable radio with ease of use because of the enhanced speech technology. The radio 14 may provide for short message transmission and reception, and enhance radio control and its operation with voice feedback for hands-off and eyes-off operation. The radio 14 also may provide for cognitive artificial intelligence and machine learning and may provide user feedback and integrated help with operational recommendations based on observed and measured performance of the communications link. Possible automated speech recognition and text-to-speech (TTS) systems that may be incorporated into the radio 14 and remote radio 20 include the systems developed as CMU Sphinx by Carnegie Mellon University and systems by SVOX based in Zurich, Switzerland.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio comprising:
   a radio frequency (RF) transmitter configured to be in communication with a remote RF receiver of a remote radio;
   an RF receiver configured to be in communication with a remote RF transmitter of the remote radio;
   an audio input transducer;
   an RF spectrum analyzer configured to analyze the RF energy across a frequency band at which the RF transmitter and RF receiver operate to determine RF performance characteristics and metrics; and
   a controller coupled to the RF transmitter, RF receiver, audio input transducer and RF spectrum analyzer, and configured to
      store a plurality of command text messages and speech text messages that are adapted for expected conditions, landmarks and capabilities for a specific time period and mission, each stored command text message comprising a command to change at least one radio operating parameter and each speech text message comprising a user command that is tailored to the specific time period and mission, each stored command text message including a coded text message associated therewith that is reduced in bit size compared to a bit size of the associated command text message, and each stored speech text message including a coded text message associated therewith that is reduced in bit size compared to a bit size of the associated speech text message,
      implement a stand-alone, speech recognition and speech-to-text function,
      receive a spoken input,
      convert the spoken input into text using the audio input transducer and the stand-alone, speech recognition and speech-to-text function,
      parse the converted text and determine if the parsed text matches a stored command text message to change the at least one radio operating parameter or a speech text message to perform a user command, when the parsed text matches the stored command text message send the coded text message associated therewith, and when the parsed text matches the stored speech message send the coded text message associated therewith,
      digitize a spoken voice message into a digitized speech message and multiplex the digitized speech message with the coded text message as an SMS message, and
      apply machine learning to the RF performance characteristics and metrics determined from the RF energy across the frequency band at which the RF transmitter and RF receiver operate to improve the speech recognition and speech-to-text function.

2. The radio of claim 1 wherein the RF transmitter has a bit rate of less than or equal to 75 bit/s.

3. The radio of claim 1 wherein the RF transmitter has a bandwidth in a range of 3 KHz to 25 KHz.

4. The radio of claim 1 wherein the RF transmitter operates in an RF band of 1.5 to 60 MHz.

5. The radio of claim 1 comprising a handheld housing containing the RF receiver, RF transmitter, audio input transducer, and controller.

6. The radio of claim 1 wherein the controller is configured to send the converted text message as an SMS message.

7. The radio of claim 1 comprising an audio output transducer; and wherein the controller is configured to generate a synthesized speech message using the audio output transducer in cooperation with the RF receiver.

8. The radio of claim 1 wherein the controller is configured to operate using machine learning.

9. The radio of claim 1 wherein the controller is configured to implement at least one command based upon at least one RF performance parameter.

10. The radio of claim 1 wherein the controller is configured to implement a multi-language translation function.

11. A portable radio comprising:
   a portable housing:
   a radio frequency (RF) transmitter carried by the portable housing and configured to be in communication with a remote RF receiver of a remote radio;
   an RF receiver carried by the portable housing and configured to be in communication with a remote RF transmitter of the remote radio;
   an audio input transducer carried by the portable housing;
   an RF spectrum analyzer carried by the portable housing and configured to analyze the RF energy across a frequency band at which the RF transmitter and RF receiver operate to determine RF performance characteristics and metrics; and
   a controller, carried by the portable housing, and coupled to the RF transmitter, RF receiver, audio input transducer and RF spectrum analyzer, and configured to
      store a plurality of command text messages and speech text messages that are adapted for expected conditions, landmarks and capabilities for a specific time period and mission, each stored command text message comprising a command to change at least one radio operating parameter and each speech text message comprising a user command that is tailored to the specific time period and mission, each stored command text message including a coded SMS text message associated therewith that is reduced in bit size compared to a bit size of the associated command text message, and each stored speech text message including a coded text message associated therewith that is reduced in bit size compared to a bit size of the associated speech text message, implement a stand-alone, speech recognition and speech-to-text function, receive a spoken input, convert the spoken input into text using the audio input transducer and the stand-alone, speech recognition and speech-to-text function, parse the converted text and determine if the parsed text matches a stored command text message to change the at least one radio operating parameter or a speech text message to perform a user command, when the parsed text matches the stored command text message send the coded text message associated therewith, and when the parsed text matches the stored speech message send the coded text message associated therewith, digitize a spoken voice message into a digitized speech message and multiplex the digitized speech message with the coded text message as an SMS message, and apply machine learning to the RF performance characteristics and metrics determined from the RF energy across the frequency band at which the RF transmitter and RF receiver operate to improve the speech recognition and speech-to-text function.

12. The portable radio of claim 11 wherein the RF transmitter has a bit rate of less than or equal to 75 bit/s.

13. The portable radio of claim 11 wherein the RF transmitter has a bandwidth in a range of 3 KHz to 25 KHz.

14. The portable radio of claim 11 wherein the RF transmitter operates in an RF band of 1.5 to 60 MHz.

15. The portable radio of claim 11 comprising an audio output transducer carried by the portable housing; and wherein the controller is configured to generate a synthesized speech message using the audio output transducer in cooperation with the RF receiver.

16. The portable radio of claim 11 wherein the controller is configured to operate using machine learning.

17. The portable radio of claim 11 wherein the controller is configured to implement at least one command based upon at least one RF performance parameter.

18. The portable radio of claim 11 wherein the controller is configured to implement a multi-language translation function.

19. A method of operating a radio comprising:

operating a controller coupled to an RF transmitter, an RF receiver, an audio input transducer and an RF spectrum analyzer that analyzes the RF energy across a frequency band at which the RF transmitter and receiver operate and determines RF performance characteristics and metrics, to store a plurality of command text messages and speech text messages that are adapted for expected conditions, landmarks and capabilities for a specific time period and mission, each stored command text message comprising a command to change at least one radio operating parameter and each speech text message comprising a user command that is tailored to the specific time period and mission, each stored command text message including a coded text message associated therewith that is reduced in bit size compared to a bit size of the associated command text message, and each stored speech text message including a coded text message associated therewith that is reduced in bit size compared to a bit size of the associated speech text message, implement a stand-alone, speech recognition and speech-to-text function, receive a spoken input, convert the spoken input into text using the audio input transducer and the stand-alone, speech recognition and speech-to-text function, parse the converted text and determine if the parsed text matches a stored command text message to change the at least one radio operating parameter or a speech text message to perform a user command, when the parsed text matches the stored command text message send the coded text message associated therewith, and when the parsed text matches the stored speech message send the coded text message associated therewith, digitize a spoken voice message into a digitized speech message and multiplex the digitized speech message with the coded text message as an SMS message, and apply machine learning to the RF performance characteristics and metrics determined from the RF energy across the frequency band at which the RF transmitter and RF receiver operate to improve the speech recognition and speech-to-text function.

20. The method of claim 19 wherein the RF transmitter has a bit rate of less than or equal to 75 bit/s.

21. The method of claim 19 wherein the RF transmitter has a bandwidth in a range of 3 KHz to 25 KHz.

22. The method of claim 19 wherein the RF transmitter operates in an RF band of 1.5 to 60 MHz.

23. The method of claim 19 wherein operating the controller comprises sending the converted text message as an SMS message.

24. The method of claim 19 wherein operating the controller comprises generating a synthesized speech message using an audio output transducer in cooperation with the RF receiver.

25. The method of claim 19 wherein operating the controller comprises operating using machine learning.

26. The method of claim 19 wherein operating the controller comprises implementing at least one command based upon at least one RF performance parameter.

27. The method of claim 19 wherein operating the controller comprises implementing a multi-language translation function.

* * * * *